United States Patent
Lendenmann et al.

(10) Patent No.: US 9,112,394 B2
(45) Date of Patent: Aug. 18, 2015

(54) OPTIMIZED COOLING SYSTEM FOR A BRUSHED ELECTRICAL MACHINE, AND A CORRESPONDING METHOD

(75) Inventors: Heinz Lendenmann, Vasteras (SE); David Lindberg, Vasteras (SE); Viktor Nyden, Shanghai (CN); Peter Isberg, Vasteras (SE)

(73) Assignee: ABB RESEARCH LTD. (CH)

( * ) Notice: Subject to any disclaimer, the term of this patent is extended or adjusted under 35 U.S.C. 154(b) by 219 days.

(21) Appl. No.: 13/372,096

(22) Filed: Feb. 13, 2012

(65) Prior Publication Data

US 2012/0139369 A1   Jun. 7, 2012

Related U.S. Application Data

(63) Continuation of application No. PCT/EP2009/060464, filed on Aug. 13, 2009.

(51) Int. Cl.
*H02K 9/04* (2006.01)
*H02K 9/28* (2006.01)
*H02K 11/00* (2006.01)

(52) U.S. Cl.
CPC .............. *H02K 9/28* (2013.01); *H02K 11/0047* (2013.01)

(58) Field of Classification Search
USPC .............. 310/53, 60 A, 61, 231–233, 249, 58
See application file for complete search history.

(56) References Cited

U.S. PATENT DOCUMENTS

| | | | | |
|---|---|---|---|---|
| 5,003,208 A | * | 3/1991 | Hama et al. | 310/68 C |
| 5,243,247 A | * | 9/1993 | Schmidt | 310/239 |
| 5,402,027 A | * | 3/1995 | Strobl | 310/239 |
| 5,777,897 A | | 7/1998 | Giorgio | |
| 5,977,740 A | * | 11/1999 | McCann | 318/701 |
| 7,221,154 B2 | * | 5/2007 | Lee | 324/207.25 |
| 7,881,058 B2 | * | 2/2011 | Romer et al. | 361/698 |
| 2005/0073206 A1 | * | 4/2005 | Wilsdorf | 310/178 |
| 2007/0278884 A1 | * | 12/2007 | Kozaki et al. | 310/90.5 |
| 2008/0150462 A1 | * | 6/2008 | Miettinen | 318/471 |
| 2009/0027854 A1 | * | 1/2009 | Romer et al. | 361/696 |
| 2009/0028720 A1 | * | 1/2009 | Tsunazawa et al. | 417/32 |

FOREIGN PATENT DOCUMENTS

| | | |
|---|---|---|
| CH | 397075 A | 8/1965 |
| CN | 1421065 A | 5/2003 |
| EP | 2218619 A1 * | 8/2010 |
| GB | 1171455 A | 11/1969 |
| JP | 59165940 A | 9/1984 |
| JP | 62037037 A | 2/1987 |
| JP | 6311703 A | 11/1994 |
| JP | 08098465 A * | 4/1996 |

(Continued)

OTHER PUBLICATIONS

JPO website translation of JP 08098465 A.*
International Preliminary Report on Patentability; Application No. PCT/EP2009/060464; Issued: Aug. 1, 2011; 10 pages.

(Continued)

*Primary Examiner* — Naishadh Desai
(74) *Attorney, Agent, or Firm* — Whitmyer IP Group LLC

(57) ABSTRACT

A cooling system for a brushed electrical machine includes a cooler configured to cool down a rotor and a commutator of the machine. There is a controller configured to adjust the cooling effect of the cooler in response to monitored rotor and commutator temperatures. The cooler includes a fan and an auxiliary motor configured to rotate the fan.

18 Claims, 3 Drawing Sheets

(56) References Cited

FOREIGN PATENT DOCUMENTS

| | | | |
|---|---|---|---|
| JP | 80968465 | A | 4/1996 |
| JP | 2001169511 | A | 6/2001 |
| JP | 2006141185 | A * | 6/2006 |
| RU | 2177669 | C2 | 12/2001 |

OTHER PUBLICATIONS

International Search Report and Written Opinion of the International Searching Authority; Application No. PCT/EP2009/060464; Issued: Mar. 22, 2010; Mailing Date: Apr. 12, 2010; 9 pages.

State Intellectual Property Office of People's Republic of China Notification of the First Office Action Application No. 200980160844.X Issued: Jul. 25, 2013 19 pages.

* cited by examiner

OPTIMIZED COOLING SYSTEM FOR A BRUSHED ELECTRICAL MACHINE, AND A CORRESPONDING METHOD

CROSS-REFERENCE TO RELATED APPLICATIONS

The present application is a continuation of pending International patent application PCT/EP2009/060464 filed on Aug. 13, 2009 which designates the United States, the content of which is incorporated herein by reference.

FIELD OF THE INVENTION

The present invention relates to a cooling system for a brushed electrical machine, and to a method for optimizing a cooling system of a brushed electrical machine from both energy efficiency point of view and brush wear point of view.

BACKGROUND OF THE INVENTION

Referring to FIG. 1, a brushed electrical machine 1 comprises a rotor 6, a stator 7, a commutator 8 and brushes 9. The brushes 9 are attached to brush bridges 10 and their purpose is to close a current circuit to the rotor windings through the commutator 8. During the operation of the machine 1, heat is generated in the windings of the machine due to copper losses, in the rotor and stator cores due to iron losses, and in the commutator 8 due to friction losses and electrical losses at the interface of the brushes 9 and the commutator 8. The machine 1 therefore has to be cooled to keep the temperature of the machine parts at an acceptable level and to thereby ensure a reliable operation of the machine 1. Cooling of an electrical machine 1 according to FIG. 1 is normally accomplished with a cooling system comprising a cooler, in this case a fan 2 that blows air through the machine 1. In a typical arrangement the fan 2 has an auxiliary motor 3 of induction type which rotates the fan 2 with a constant speed. The cooling air is drawn into the machine 1 through an air inlet 4, and after flowing through the interior of the machine 1 the air is exhausted into the ambient of the machine 1 through an air outlet 5.

In order to ensure a proper cooling under all operating conditions, the cooling effect of the cooler has to be dimensioned to correspond to the maximum load of the machine 1 run at a maximum allowed ambient temperature. In the case of the cooler according to FIG. 1, running the fan 2 at a constant speed leads to a considerably low machine temperature under many operating conditions, particularly so under low load conditions and under operation in cold environment.

In order to improve the energy efficiency of a cooling system comprising a fan and an auxiliary motor, it is a known technology to provide the auxiliary motor with a variable speed drive and to adjust the rotational speed of the fan in relation to a measured or estimated machine temperature. A control system wherein a variable speed drive generates a control signal in accordance to a temperature signal detected by a temperature sensor that is connected to the machine is known e.g. from JP62037037.

A method for controlling the temperature within an electrical device by adjusting the rotational speed of a fan in relation to an electrical load of the electric device, ambient temperature and an air flow past the electrical device is known from U.S. Pat. No. 5,777,897.

As is well known to a person skilled in the art, most typical commutator brushes are made of carbon, usually together with some form of additive compound for increased performance and operation under special conditions. One problem related to brushed machines is brush wear which is strongly dependant on the commutator temperature. Both too low and too high temperatures lead to an extensive brush wear, the increase of the wear being dramatic at low temperatures.

Because the known temperature controlling methods tend to emphasize the reduction of copper losses that decrease with a decreasing temperature, the reference temperature is many times chosen to be relatively low. From the brush wear point of view the conventional temperature controlling methods often result to too high cooling effect such that the low commutator temperature causes an unnecessary high brush wear rate. Too high cooling effect also leads to unnecessary high energy consumption in the auxiliary motor, and the energy efficiency of the overall combination of the brushed electrical machine and the auxiliary motor is worsened. In other situations the cooling effect can be adjusted to be too low, causing the commutator to overheat. The overheating may occur especially shortly after the start-up of the machine when the commutator warms up faster than the magnetically active parts.

A device for lowering especially the surface temperature of a commutator and brushes is known from JP2001169511 which discloses a fan that is configured to automatically rotate together with a rotor shaft when the temperature around the commutator is higher than predetermined.

SUMMARY OF THE INVENTION

One object of the invention is to provide a cooling system for a brushed electrical machine, the cooling system being optimized with regard to brush wear and to the overall efficiency of a combination comprising the brushed electrical machine and the cooling system.

These and other objects are achieved by aspects and embodiments of the invention described herein.

The invention is based on the realization that since the known temperature controlling methods do not take the commutator temperature into consideration, the resulting cooling adjustments are not optimal from the brush wear point of view.

According to a first aspect of the invention, there is provided a cooling system for a brushed electrical machine comprising a rotor and a commutator, the cooling system comprising: a cooler configured to cool down the rotor and the commutator, a first temperature monitoring device adapted to monitor a commutator temperature, a second temperature monitoring device adapted to monitor a rotor temperature, a controller being configured to adjust a cooling effect of the cooler in response to the monitored rotor and commutator temperatures. By monitoring both commutator and rotor temperatures, a cooling system for a brushed electrical machine can be optimized both from energy efficiency point of view and from brush wear point of view.

According to one embodiment of the invention, the cooler comprises a fan and an auxiliary motor configured to rotate the fan, and the controller is configured to adjust the rotational speed of the auxiliary motor. By these provisions, a simple way of adjusting the cooling effect of the cooler is achieved.

According to one embodiment of the invention, the first temperature monitoring device comprises an inductive sensor. An inductive sensor is a preferred sensor type for measuring the commutator temperature because by using an inductive sensor the temperature can be directly measured from a distance. Moreover, an inductive sensor is insensible against dirt like carbon dust.

According to one embodiment of the invention, the first temperature monitoring device comprises an infrared (IR) sensor. An IR sensor is an alternative sensor type for measuring the commutator temperature from a distance.

According to one embodiment of the invention, the first temperature monitoring device comprises a temperature sensor connected to a brush bridge. By estimating the commutator temperature from a measured brush bridge temperature an alternative temperature monitoring means is provided wherein the temperature can be measured from a non-rotating object.

According to one embodiment of the invention, the first temperature monitoring device comprises a thermal motor model. By estimating the commutator temperature with help of a thermal motor model, a sensor required for directly or indirectly measuring the temperature can be left out.

According to one embodiment of the invention, the second temperature monitoring device comprises a temperature sensor connected to an interpole of a stator. By estimating the rotor temperature from a measured interpole temperature there is no need to measure the temperature from a rotating object.

According to one embodiment of the invention, the second temperature monitoring device comprises a thermal motor model. By estimating the rotor temperature with help of a thermal motor model, a sensor required for directly or indirectly measuring the temperature can be left out.

According to a second aspect of the invention, there is provided a method for optimizing a combination comprising a brushed electrical machine and a cooling system, the brushed electrical machine comprising a rotor and a commutator, and the cooling system comprising a cooler configured to cool down the rotor and the commutator, the method comprising the steps of: monitoring the commutator temperature, monitoring the rotor temperature, and adjusting the cooling effect of the cooler in response to the monitored rotor and commutator temperatures. By monitoring both commutator and rotor temperatures, a method can be provided for optimizing a combination comprising a brushed electrical machine and a cooling system, which method takes into account both energy efficiency and brush wear.

According to one embodiment of the invention, the cooler comprises a fan, and the method further comprises the step of adjusting the rotational speed of the fan. By these provisions, a simple way of adjusting the cooling effect of the cooler is achieved.

According to one embodiment of the invention, the fan is rotated at a relatively high speed when the rotor temperature is above a first threshold value. By defining a threshold value for the rotor temperature the auxiliary motor is not rotated at unnecessary high speed under low load or low temperature conditions. A preferred first threshold value for the rotor temperature is 120° C.

According to one embodiment of the invention, the fan is rotated at a relatively low speed when the rotor temperature is below the first threshold value, and the commutator temperature is below a second threshold value. By defining a lower threshold value for the commutator temperature the brush wear can be decreased by letting the commutator to warm up. A preferred second threshold value is 70° C.

According to one embodiment of the invention, the fan is rotated at a relatively high speed when the rotor temperature is below the first threshold value, and the commutator temperature is above a third threshold value. By defining a higher threshold value for the commutator temperature the brush wear can be decreased by cooling down the commutator. A preferred third threshold value is 110° C.

According to one embodiment of the invention, the fan is rotated at a speed between the relatively low and the relatively high speeds when the rotor temperature is below the first threshold value, and the commutator temperature is between the second and the third threshold values, the rotational speed of the fan being adjusted to maintain a certain reference temperature inside the electrical machine. By choosing an appropriate reference temperature the energy efficiency and the brush wear can be furthermore optimized. A preferred reference temperature is between 85° C. and 95° C.

BRIEF DESCRIPTION OF THE DRAWINGS

The invention will be explained in greater detail with reference to the accompanying drawings, wherein.

DETAILED DESCRIPTION OF THE INVENTION

Figure 1:
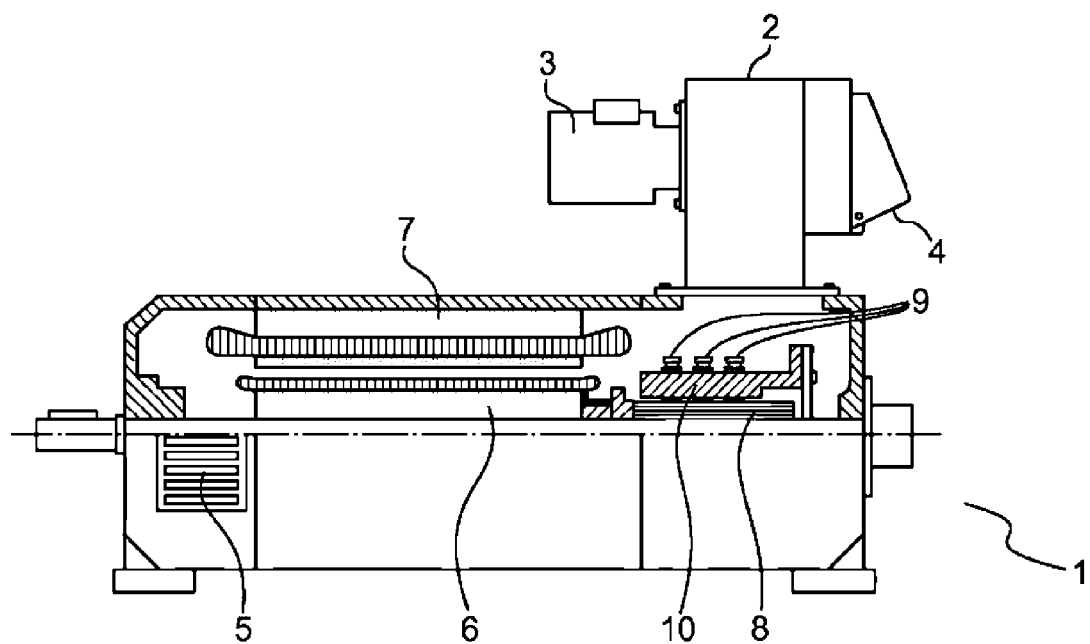
FIG. 1 shows an electrical motor with a conventional cooling arrangement.
Figure 2:
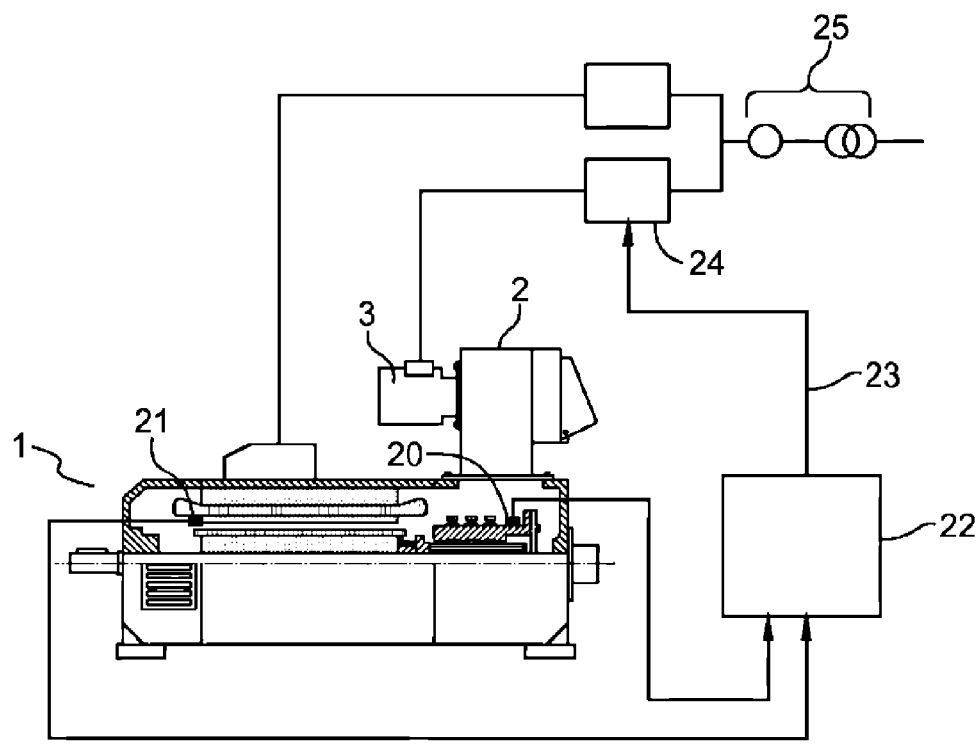
FIG. 2 shows a block diagram of a cooling system according to one embodiment of the invention.

FIG. 2 depicts an electrical machine 1 with a cooling system according to one embodiment of the invention. The cooling system is provided with a fan 2 and an auxiliary motor 3 for rotating the fan 2. There are two temperature sensors 20, 21; one for measuring the commutator temperature and the other for measuring the rotor temperature. The temperature signals are sent to a controller 22 which comprises a control algorithm for generating a control signal 23. The control signal 23 is sent to a frequency converter 24 which feeds the auxiliary motor 3 and defines the fan speed in accordance to the control signal 23. An external electrical network 25 is providing power both to the auxiliary motor 3 and to the electrical machine 1.

The temperature measurement arrangement may comprise an inductive sensor or an IR sensor for measuring the commutator temperature, and a resistance thermometer for measuring the temperature at an interpole of the stator. Actually, since the iron losses occur in the rotor, it is the rotor temperature that is of interest rather than the interpole temperature, but because the measuring arrangement becomes simpler with a temperature sensor attached to the stator, the rotor temperature may be estimated from the measured interpole temperature. A look-up table may be used for estimating the rotor temperature. Alternatively, the rotor temperature can be measured directly from the rotor. The commutator temperature can be alternatively monitored by measuring a brush bridge temperature and estimating the commutator temperature from the measured brush bridge temperature value.

Figure 3:
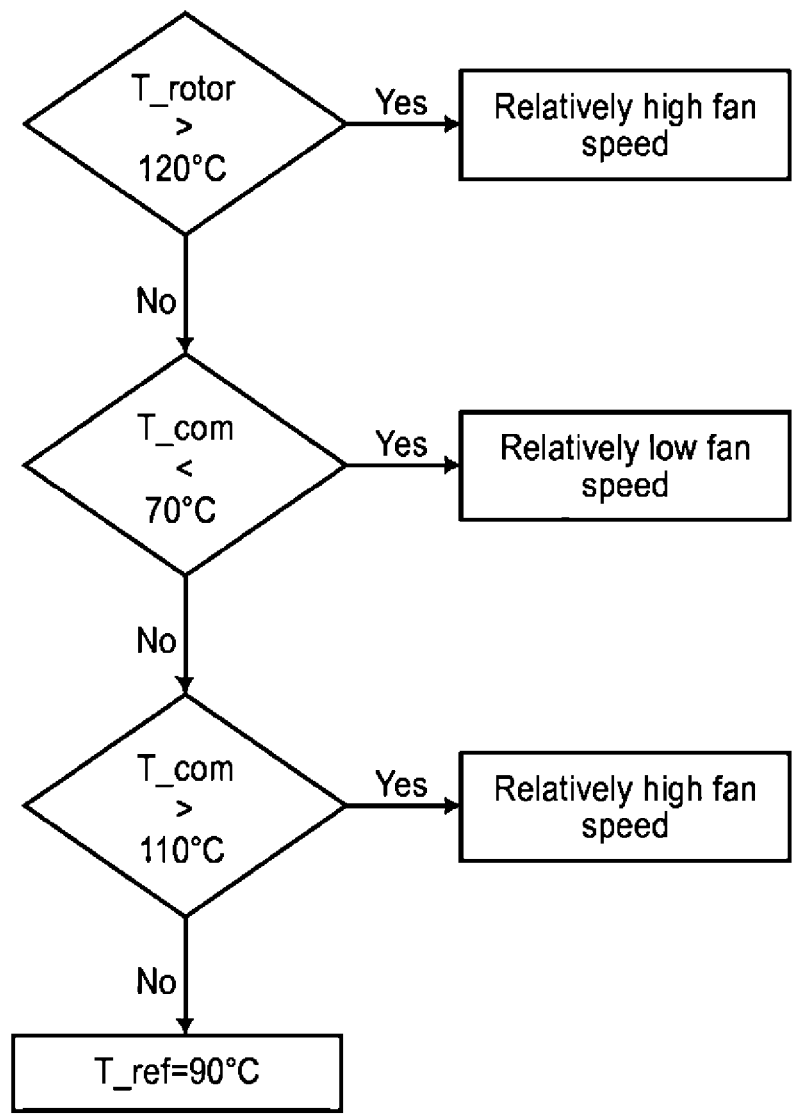
FIG. 3 shows a flow chart depicting a control algorithm according to one embodiment of the invention.

FIG. 3 shows a preferable control algorithm in form of a flow chart. The fan is rotated at a maximum or relatively high speed when the rotor temperature is over 120° C. or the commutator temperature is over 110° C. When the rotor temperature is below 120° C. and the commutator temperature is below 70° C., the fan is rotated at a minimum or relatively low speed. Otherwise, the fan is rotated at a speed between the maximum and minimum speeds with the aim to reach the reference rotor temperature of 90° C.

An induction motor generally has a maximum speed of 1500 r/min. With a relatively high speed a speed between 90% and 110% of the maximum speed is meant. A speed above 100% of the maximum speed is so called off-rated speed, it being possible to drive an induction motor with such off-rated speed for a short period of time. With a relatively low speed a speed below 50% of the maximum speed is meant. The minimum speed of the fan depends on the overall construction of the fan and the auxiliary motor, but preferably there is always at least a weak flow of cooling air through the machine and therefore it is not desirable that the fan stands still. Moreover, possible resonance speeds between the minimum and maximum speeds should be avoided.

Figure 4:
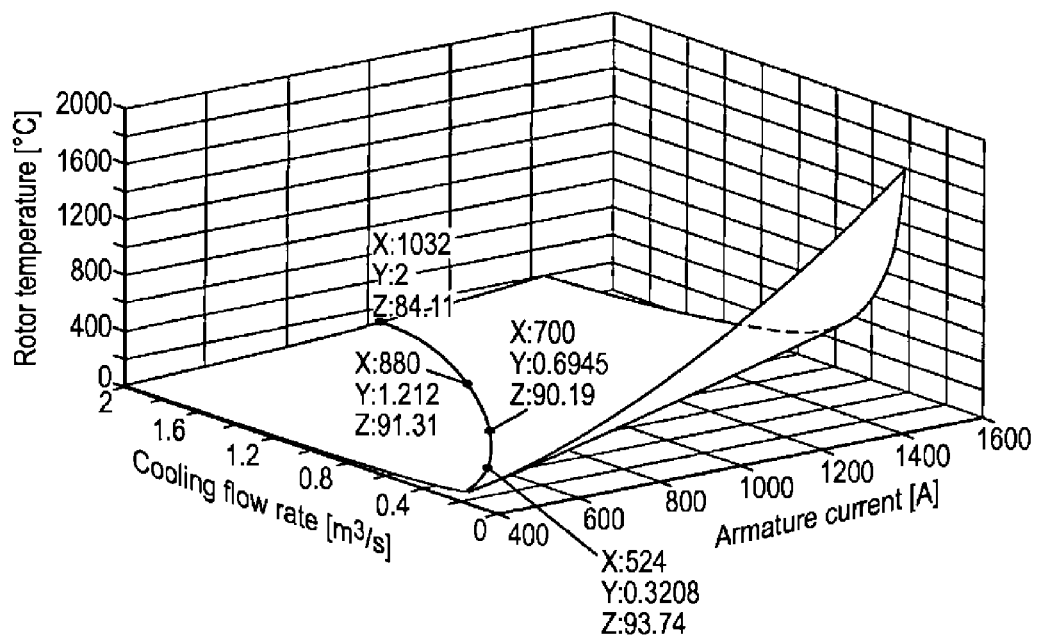
FIG. 4 is a graphical view showing the dependency of the rotor temperature from the rotor current and the cooling flow rate in an example machine.

The diagram in FIG. 4 shows how the rotor temperature varies as a function of the rotor current and the cooling flow. The black line is illustrating an optimal operating curve from the energy efficiency point of view taking into account the iron losses in the rotor and the energy consumption of the auxiliary motor. As the rotor current exceeds certain value, the auxiliary motor is rotating the fan at its maximum speed. At lower loads, however, the fan speed is significantly decreased to follow the optimal curve. Furthermore, as can be discovered from the diagram, the optimal curve represents a substantially constant rotor temperature close to 90° C. independently from the machine load. This is a significant and surprising discovery which enables an optimization of the energy efficiency with a very simple control algorithm that is based on temperature measurements alone. It has to be kept in mind, however, that the diagram in FIG. 4 only applies to a certain combination wherein the effect of the electrical machine is rated to 716 kW and the auxiliary motor has an effect of 11 kW.

In order to avoid extensive brush wear, it is established that the commutator temperature should be kept between the limits of 70° C. and 110° C. Preferably, the commutator temperature should lie between 85° C. and 95° C. It is a clear advantage that the optimal commutator temperature lies close to the optimal rotor temperature. This discovery makes it easier to design a cooling system wherein the substantially same optimal temperature can be remained at the commutator and the rotor of the machine.

Figure 5:
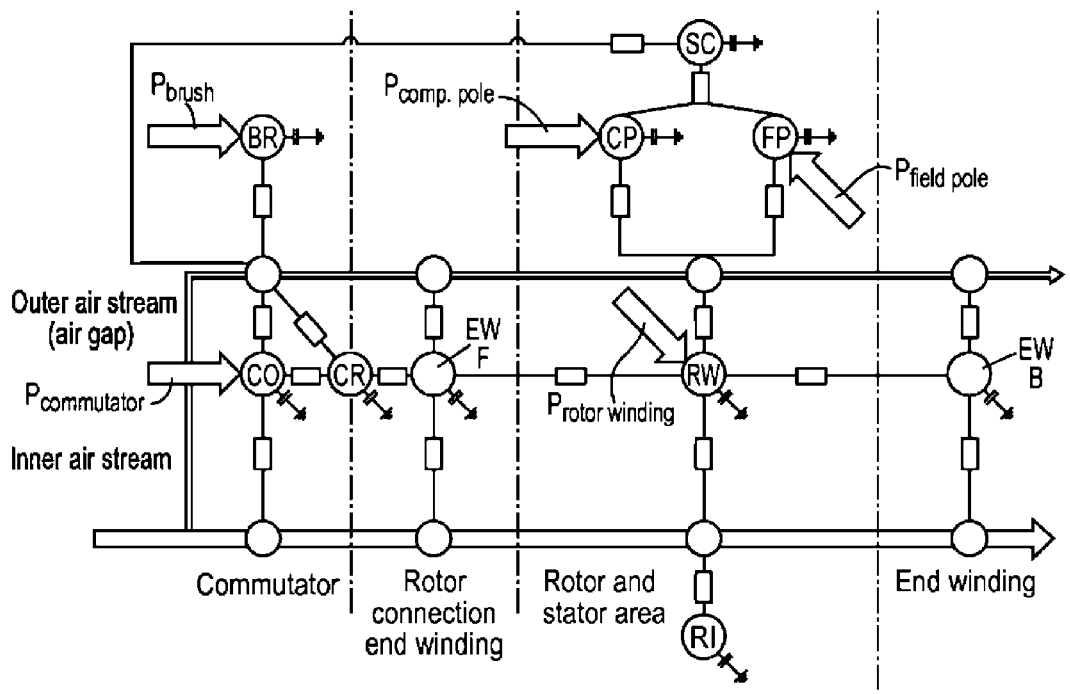
FIG. 5 shows a thermal model of an electrical machine.

FIG. 5 shows a thermal model of an electrical machine. The model takes account of all the thermally significant parts of the machine such as brushes (BR), commutator (CO), commutator risers (CR), front side rotor end windings (EWF), back side rotor end windings (EWB), commutator and compensation coils (CP), main field coils (FP), rotor coils (RW), rotor core (RI) and stator core (SC). The black dots denote air knots and the black boxes denote thermal resistances. Also thermal capacitors are illustrated. The arrows denote the quantity of supplied power.

A thermal model can be used for constantly estimating temperatures in different parts of the machine. Therefore, a thermal model can also be used for monitoring the commutator or the rotor temperature. In one possible solution only one of the commutator and rotor temperatures is measured either directly or indirectly, and the other one is estimated by using a thermal model. It is also possible to entirely rely on a thermal model and to estimate both commutator and rotor temperatures without directly measuring the temperature anywhere in the machine. This kind of estimation can be based e.g. on main current that is given as an input to the thermal model.

When talking about temperature monitoring in the context of the present invention, the term "monitoring" is to be understood widely including both direct and indirect measuring as well as estimation e.g. by using a thermal model like that presented in FIG. 5. Analogously, with the term "temperature monitoring device" is to be understood both temperature sensors and thermal models or parts of thermal models created for estimating temperatures in different parts of an electrical machine.

The invention is not limited to the embodiments shown above, but the person skilled in the art may modify them in a plurality of ways within the scope of the invention as defined by the claims.

What is claimed is:

1. A cooling system for a brushed electrical machine comprising a rotor and a commutator, the cooling system comprising:
   a cooler configured to cool down the rotor and the commutator,
   a first temperature monitoring device adapted to monitor a commutator temperature,
   a second temperature monitoring device adapted to monitor a rotor temperature, and
   a controller being configured to adjust a cooling effect of the cooler in response to the monitored rotor and commutator temperatures,
   wherein the controller comprises a control algorithm where at least one output value of the control algorithm depends both on the commutator temperature and on the rotor temperature.

2. The cooling system according to claim 1, wherein the cooler comprises a fan and an auxiliary motor configured to rotate the fan, and the controller is configured to adjust the rotational speed of the auxiliary motor.

3. The cooling system according to claim 1, wherein the first temperature monitoring device comprises an inductive sensor.

4. The cooling system according to claim 1, wherein the first temperature monitoring device comprises an IR sensor.

5. The cooling system according to claim 1, wherein the first temperature monitoring device comprises a temperature sensor connected to a brush bridge.

6. The cooling system according to claim 1, wherein the first temperature monitoring device comprises a thermal motor model.

7. The cooling system according to claim 1, wherein the second temperature monitoring device comprises a thermal motor model.

8. A method for optimizing a brushed electrical machine having a cooling system, the brushed electrical machine comprising a rotor and a commutator, and the cooling system comprising a cooler configured to cool down the rotor and the commutator, the method comprising the steps of:
   monitoring the commutator temperature,
   monitoring the rotor temperature, and
   adjusting the cooling effect of the cooler in response to the monitored rotor and commutator temperatures, wherein at least at one instant the adjustment depends both on the commutator temperature and on the rotor temperature.

9. The method according to claim 8 wherein the cooler comprises a fan, and the method further comprises the step of adjusting the rotational speed of the fan.

10. The method according to claim 9, wherein the fan is rotated at a relatively high speed when the rotor temperature is above a first threshold value.

11. The method according to claim 10, wherein the fan is rotated at a relatively low speed when the rotor temperature is below the first threshold value, and the commutator temperature is below a second threshold value.

12. The method according to claim 11, wherein the fan is rotated at a relatively high speed when the rotor temperature is below the first threshold value, and the commutator temperature is above a third threshold value.

13. The method according to claim 12, wherein the fan is rotated at a speed between the relatively low and the relatively high speeds when the rotor temperature is below the first threshold value, and the commutator temperature is between the second and the third threshold values, the rotational speed of the fan being adjusted to maintain a certain reference temperature inside the electrical machine.

14. The method of claim 8, wherein at least at one instant the adjustment depends both on the commutator temperature and on the rotor temperature.

15. The cooling system according to claim 1, wherein the first temperature monitoring device monitors the commutator temperature from a non-rotating object.

16. The cooling system according to claim 1, wherein the second temperature monitoring device monitors the rotor temperature from a non-rotating object.

17. The method according to claim 8, wherein the commutator temperature is monitored from a non-rotating object.

18. The method according to claim 8, wherein the rotor temperature is monitored from a non-rotating object.

* * * * *